United States Patent
Ben-Natan

(10) Patent No.: US 7,426,512 B1
(45) Date of Patent: Sep. 16, 2008

(54) SYSTEM AND METHODS FOR TRACKING LOCAL DATABASE ACCESS

(75) Inventor: Ron Ben-Natan, Lexington, MA (US)

(73) Assignee: Guardium, Inc., Waltham, MA (US)

( * ) Notice: Subject to any disclaimer, the term of this patent is extended or adjusted under 35 U.S.C. 154(b) by 228 days.

(21) Appl. No.: 10/780,407

(22) Filed: Feb. 17, 2004

(51) Int. Cl.
G06F 17/30 (2006.01)
G06F 7/00 (2006.01)

(52) U.S. Cl. .................... 707/9; 707/1; 707/10

(58) Field of Classification Search ............ 707/9, 707/2
See application file for complete search history.

(56) References Cited

U.S. PATENT DOCUMENTS

| | | | | |
|---|---|---|---|---|
| 6,061,797 | A * | 5/2000 | Jade et al. | 726/15 |
| 6,070,243 | A * | 5/2000 | See et al. | 726/2 |
| 6,119,236 | A * | 9/2000 | Shipley | 726/22 |
| 6,304,975 | B1 * | 10/2001 | Shipley | 726/22 |
| 6,687,702 | B2 * | 2/2004 | Vaitheeswaran et al. | 707/10 |
| 6,941,369 | B1 * | 9/2005 | Krack et al. | 709/225 |
| 2002/0066038 | A1 * | 5/2002 | Mattsson et al. | 713/202 |
| 2002/0154646 | A1 * | 10/2002 | Dubois et al. | 370/406 |
| 2002/0157020 | A1 * | 10/2002 | Royer | 713/201 |
| 2003/0028624 | A1 * | 2/2003 | Hasan et al. | 709/220 |
| 2003/0084320 | A1 * | 5/2003 | Tarquini et al. | 713/200 |
| 2003/0084328 | A1 * | 5/2003 | Tarquini et al. | 713/200 |
| 2003/0182580 | A1 * | 9/2003 | Lee | 713/201 |
| 2004/0111623 | A1 * | 6/2004 | Miller et al. | 713/182 |
| 2004/0260947 | A1 * | 12/2004 | Brady et al. | 713/201 |
| 2005/0005031 | A1 * | 1/2005 | Gordy et al. | 709/250 |
| 2005/0071650 | A1 * | 3/2005 | Jo et al. | 713/188 |
| 2005/0086529 | A1 * | 4/2005 | Buchsbaum | 713/201 |

OTHER PUBLICATIONS

Jones, Katherine, "Secure Internet Access to SAP's R/3: Keeping Dragons Out", Int. J. Network Mgmt., vol. 8, © 1998, pp. 191-199.*
Joshi, James B. D., et al., "Security Models for Web-Based Applications", Communications of the ACM, vol. 44, No. 2, Feb. 2001, pp. 38-44.*

(Continued)

*Primary Examiner*—Cam-Y Truong
*Assistant Examiner*—Robert Stevens
(74) *Attorney, Agent, or Firm*—Chapin IP Law, LLC

(57) ABSTRACT

Network based intrusion detection analyzes DB access attempts prior to transport into the host computer system and accordingly, mitigate resource overhead. However, host computer systems often employ local access such as a DBA account. Monitoring access attempts via the network monitor may not encompass such local access attempts. A data security device which intercepts both local and remote access attempts to the database resource monitors all database access attempts for auditing and security analysis. The data security device receives local access transactions via a local agent on the host. The local agent identifies and integrates with an interprocess communication (IPC) mechanism on the host computer system. The local agent implements an IPC interception mechanism to direct local database access attempts to the local agent, which then forwards the intercepted attempts to the data security device for further analysis. The network data security device therefore observes local access attempts via interception and transmission to the data security device, thereby consolidating analysis and logging of the data access attempts via the data security device.

39 Claims, 8 Drawing Sheets

OTHER PUBLICATIONS

Muller, Nathan J., "Improving Network Operations With Intelligent Agents", Int. J. Network Mgmt., vol. 7, © 1997, pp. 116-126.*

Jaeger, T., et al., "Flexible Access Control Using IPC Redirection", Proc. of the 7th Workshop on Hot Topics in Operating Systems, Mar. 29-30, 1999, pp. 191-196.*

Roscheisen, Martin, et al., "A Communication Agreement Framework for Access/Action Control", 1996 IEEE Symposium on Security and Privacy, © 1996, pp. 154-163.*

Appenzeller, Guido, et al., "User-Friendly Access Control for Public Network Ports", IEEE 0-7803-5417-6/99, © 1999, pp. 699-707.*

Balasubramaniyan, Jai Sundar, et al., "An Architecture for Intrusion Detection Using Autonomous Agents", 14th Annual Computer Security Applications Conf. Proc., Phoenix, AZ, Dec. 7-11, 1998, pp. 13-24.*

Gangadharan, Muralidaran, et al., "Intranet Security with Micro-Firewalls and Mobile Agents for Proactive Intrusion Response", IEEE Int'l Conf. on Computer Networks and Mobile Computing, Beijing, China, Oct. 16-19, 2001, pp. 325-332.*

Miller, Sandra Kay, "The Trusted OS Makes a Comeback", Computer, vol. 34, Issue 2, Feb. 2001, pp. 16-19.*

Microsoft Computer Dictionary, 5th Edition, Microsoft Press, Redmond, WA, © 2002, p. 22.*

Chari, Suresh N., et al., "BlueBoX: A Policy-Driven, Host-Based Intrusion Detection System", ACM Transactions on Information and System Security, vol. 6, No. 2, May 2003, pp. 173-200.*

Schepers, Filip, et al., "Network-Versus Host-Based Intrusion Detection", Information Security Technical Report, vol. 3, Issue 4, © 1998, pp. 32-42.*

Levine, John, et al., "The Use of Honeynets to Detect Exploited Systems Across Large Enterprise Networks", Proc. of the 2003 IEEE Workshop on Information Assurance, West Point, NY, Jun. 18-20, 2003, pp. 92-99.*

Kewley, Dorene L., et al., "DARPA Information Assurance Program Dynamic Defense Experiment Summary", IEEE Transactions on Systems, Man and Cybernetics—Part A: Systems and Humans, vol. 31, No. 4, Jul. 2001, pp. 331-336.*

* cited by examiner

SYSTEM AND METHODS FOR TRACKING LOCAL DATABASE ACCESS

BACKGROUND OF THE INVENTION

In a data storage and retrieval environment, data security techniques enforce selective access to a protected resource such as a data storage repository, or database. A data security monitor analyzes incoming data access attempts, and determines the propriety of the access. The data security monitor examines security variables such as the originator or user of the access attempt and the data and/or objects sought for access. The data security monitor analyzes the security variables against an access policy of rules or behavior which define allowable access attempts. Such selective access allows access attempts from authorized sources, and denies unauthorized access attempts as intrusions.

Conventional data security monitors typically enforce either a network based or host based approach to intrusion detection. A conventional host based monitor analyzes access attempts from the perspective of the computer system performing the access operations to database (DB) host, typically from an agent process executing on the host. The host based monitor analyzes incoming data access attempts employing local variables such as the local login account and method of access. A network based intrusion detection monitor operates on the outside network paths into the host. Such a network based approach operates on a remote computer system, such as a data security device, connected to the host. Such a conventional network based approach analyzes variables such as the source IP address and subnet, and may also have access to data specific fields such as objects and attributes. Database applications have a particular need for such intrusion detection because such applications control access to a substantial quantity of possibly sensitive data. In a Structured Query Language (SQL) database environment, for example, the network based device may have access to the tables and attributes of the corresponding SQL schema, and therefore be operable to apply SQL specific access policy to the incoming access attempts.

SUMMARY

Conventional data security applications employ network based or host based approaches. Host based approaches monitor operations on the local computer system, or host, performing access to the protected resource, such as a database. In a conventional host based security monitor, however, the security monitor may impose substantial overhead on the primary communications path to the database. The conventional security monitor receives and analyzes each data access attempt, usually logging transactions and flagging those deemed as possible intrusions. Further, such conventional security monitors apply only after a successful connection into the host machine. Malicious or undesirable transmissions which elude analysis may have already established a local foothold, thus posing a greater security risk.

In contrast, network based intrusion detection analyzes DB access attempts prior to transport into the host computer system. Such network based monitors, therefore, do not consume CPU or storage resources on the host. A typical network based monitor may be provided in a standalone computer system on a network connection into the host computer system, or may be integrated with other computing systems such as an intranet gatekeeper or firewall system. Therefore, network based approaches allow monitoring, logging, and analysis of database access attempts without burdening the host computer, and also operate prior to transmission of the alleged intrusion into the host computer. However, host computer systems often employ local access techniques for maintenance, ad-hoc, and troubleshooting or mission-critical patches. Such local access techniques usually employ a conventional DBA database administrator account or trusted dial-up link. Such local access techniques may bypass the conventional network based monitoring, since the access attempt emanates locally at the host. Accordingly, operations such as auditing, logging, and monitoring database access attempts and transactions via the network monitor may not encompass such local access attempts.

Configurations of the invention are based, in part, upon the observation that conventional network based database monitoring mechanisms may not encompass local access attempts such as a local DBA login. Auditing and logging operations, as well as highly security-sensitive applications, may expect inclusion of all local and remote access attempts. Accordingly, it would be beneficial to identify an access point common to local and remote DB access attempts, intercept local access attempts to the database resource, and transport the intercepted access attempts to a data security device operable for network monitoring of the access attempts. It would be further beneficial if the interception of the local access attempts occurs via a minimal footprint implementation object to mitigate resource overhead. In this manner, a network data security device observes the local access attempts via interception by a local host agent that transmits access information to the data security device, and observes remote access attempts via the network, thereby consolidating analysis and logging of the data access attempts to the database resource via the data security device.

Configurations of the invention substantially overcome the above described shortcomings with conventional network based security by providing a lightweight local agent for rerouting local (i.e. host-based) access attempts to a network data security device. Therefore, the lightweight local agent effectively offloads security decisions, and accompanying overhead, to the data security device (appliance), relieving the host of the overhead typically associated with conventional host-based security measures. The data security device handles all network access, and also supports local access, thereby allowing complete security coverage for network and local access attempts from a single consolidated appliance.

The data security device, therefore, intercepts local access attempts to the database resource via the local agent. Accordingly, the data security device monitors all database access attempts for auditing, logging, and security analysis and reporting. The data security device receives local access transactions via a local agent on the host. The local agent identifies and integrates with an interprocess communication (IPC) mechanism employed by the database resource on the host computer system. Typical conventional database resources employ a common DB access gateway for access to the DB from a variety of local and remote sources. Typically, a network library (e.g. Netlib, as is known to those of skill in the art), is employed for providing a common API to the access gateway for the various types of DB access, such as TCP/IP, shared memory, Windows Pipes, Unix sockets, and other IPC mechanisms. The local DB access attempts typically employ such shared memory, or another IPC mechanism, to transport communications between a local DB client and the database access gateway. In a particular configuration, discussed further below, the local agent implements an IPC interception mechanism by modifying the Netlib to direct local database access attempts to the local agent. The local agent then forwards the intercepted database access attempts to the data security device for further analysis, therefore completing the scope of monitoring, logging, and auditing by the remote data security device.

In further detail, the method of monitoring access to a protected database includes identifying a local attempt to access the database, in which the access attempt is directed to an access gateway of the database resource. An IPC intercept intercepts the identified attempt to access the database resource, in which intercepting the access attempt occurs in a prioritized manner with respect to receipt of the access attempt by the access gateway. The prioritized receipt (i.e. before receipt by the access gateway) is transmitted, in a nondestructive manner, to a local agent, in which the nondestructive manner preserves the intercepted access attempt for successive receipt by the access gateway, to maintain the underlying database transaction.

The intercepted access attempt may be indicative of a DB instruction, such as a SQL add, modify, or delete, and the local agent is in communication with the data security device operable to analyze the propriety of the access attempt from objects and data values referenced by the DB instruction. The interception of the access attempt occurs in a prioritized manner with respect to the DB access gateway, and therefore the IPC intercept receives the access attempt into an interception register prior to receipt by the access gateway. The local agent invokes a prioritized request to activate a reading operation of the interception register, in which the invocation occurs prior to activation of a read operation of the access attempt on behalf of the access gateway, and the local agent reads the access attempt from the interception register. The interception register subsequently appears undisturbed to the access gateway.

Prior to identification of the access attempt, the local agent establishes the IPC intercept to receive IPC communications directed to the access gateway prior to receipt of the IPC communication by the access gateway. Such identification of an access attempt involves listening, at a common access point, for an incoming connection to the database resource. Such a common access point is an access point or interface adapted to aggregate access attempts to the database resource from a plurality of access mediums. In the particular exemplary configuration described below, the common access point is a network application programming interface conversant in a plurality of protocols and operable to include dynamic interfaces between the plurality of protocols and the database resource. Such protocols may include, by way of example only, TCP/IP, shared memory, Banyan Vines, Named Pipes, ports and sockets. In the exemplary configuration, the common access point is supported by the Netlib DLL aggregation of libraries supporting the various types of local and remote DB access, described further below.

In a particular configuration, intercepting the access attempt involves receiving, an indication of an IPC communication indicative of a DB access attempt from a notification object responsive to an event handler. The event handler and notification objects employ a signaling system supporting the IPC mechanism described further below. The notification object identifies an instruction register in a shared memory area, in which the instruction register has a database instruction corresponding to an access attempt. The notification object triggers a retrieval of the DB instruction from the identified instruction register, and the local agent transmits the retrieved DB instruction to the data security device.

In the exemplary configuration, establishing the interface wrapper further comprises integrating with the signaling system by identifying an event corresponding to a communication via the IPC mechanism. The local agent then identifying a local event object corresponding to the event, in which the local event object has a notification list adapted to include registrants of an occurrence of the event. The local agent is then registered (subscribed) to the event in the corresponding notification list, in which the local agent is registered before the access gateway in order to receive notifications prior to receipt of the notification by the registered access gateway.

Establishing the intercept includes first determining an IPC mechanism to be employed by a local client for accessing the DB resource. The local agent establishes an interface wrapper between the access gateway and the local client, in which the interface wrapper is operable to identify an IPC mechanism adapted to transport communications between the access gateway and the local client. The local agent then modifies the identified IPC mechanism to inform the local agent of the communications between the access gateway and the local client prior to informing the access gateway of the communication. Accordingly, the local agent establishes an IPC intercept from a common access point employed by database clients for accessing the DB resource, and receiving the access attempt at the local agent via the IPC intercept prior to receipt of the access attempt by the access gateway.

The local agent is a lightweight agent operable to intercept the access attempt and transmit the intercepted DB instruction to a data security device. Accordingly, the local agent has only a substantially insignificant effect on a DB host supporting the DB server. In this manner, the local agent need not perform the computations to monitor, analyze, and log the access attempt since it effectively offloads such processing to the data security device. Implementing the local agent therefore involves identifying a plurality of access paths to a protected DB resource, and identifying a common access point for the access paths to the protected resource, in which access attempts occurring exclusively via the identified access point for the identified access paths. In the exemplary configuration below, the IPC mechanism is a shared memory portion including a plurality of instruction registers, in which the instruction registers are operable to buffer a DB instruction for receipt by the access gateway.

The invention as disclosed above is described as implemented on a computer having a processor, memory, and interface operable for performing the steps and methods for monitoring access to a protected database as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Configurations of the invention substantially overcome the above described shortcomings of conventional network based intrusion detection and monitoring by intercepting local access attempts in addition to the substantial portion of database access attempts occurring via the network via the data security device. Auditing and logging operations, as well as highly security-sensitive applications, expect coverage of all local and remote access attempts. Therefore, the present claims define an IPC intercept to identify an access point common to local and remote DB access attempts, intercept local access attempts to the database resource, and transport the intercepted access attempts to a data security device operable for network monitoring of the access attempts. The IPC intercept performs interception of the local access attempts through a minimal footprint implementation object to mitigate resource overhead. In this manner, the remote network data security device observes both the local access attempts via interception at the DB host and transmission of the intercepted access attempts to the data security device, and the remote access attempts via the network, thereby consolidating analysis and logging of the data access attempts to the database resource via the data security device.

The data security device, therefore, intercepts both local and remote access attempts to the database resource. Accordingly, the data security device monitors all database access attempts for auditing, logging, and security analysis and reporting. The data security device receives local access transactions via a local agent on the host. The local agent identifies and integrates with an interprocess communication (IPC) mechanism such as shared memory/Direct Memory Access (DMA) on the host computer system. Typical conventional database resources employ a DB access gateway for providing a common API for various types of DB access, such as TCP/IP, shared memory, Windows Pipes, Unix sockets, and other IPC mechanisms. As indicated above, a common API known as "Netlib" is provided by certain vendors an implementation in certain products. Specifically, Microsoft® SQL Server and Sybase® employ the Netlib implementation in certain products for facilitating access from different mediums. In the exemplary configuration below, the local DB access attempts employ shared memory to transport communications between a local DB client and the access gateway. In the particular configuration, discussed further below, the local agent implements an IPC interception mechanism by modifying the common API to intercept and direct local database access attempts to the local agent. The local agent then forwards the intercepted database access attempts to the data security device for further analysis, therefore completing the scope of monitoring, logging, and auditing by the remote data security device.

Figure 1:
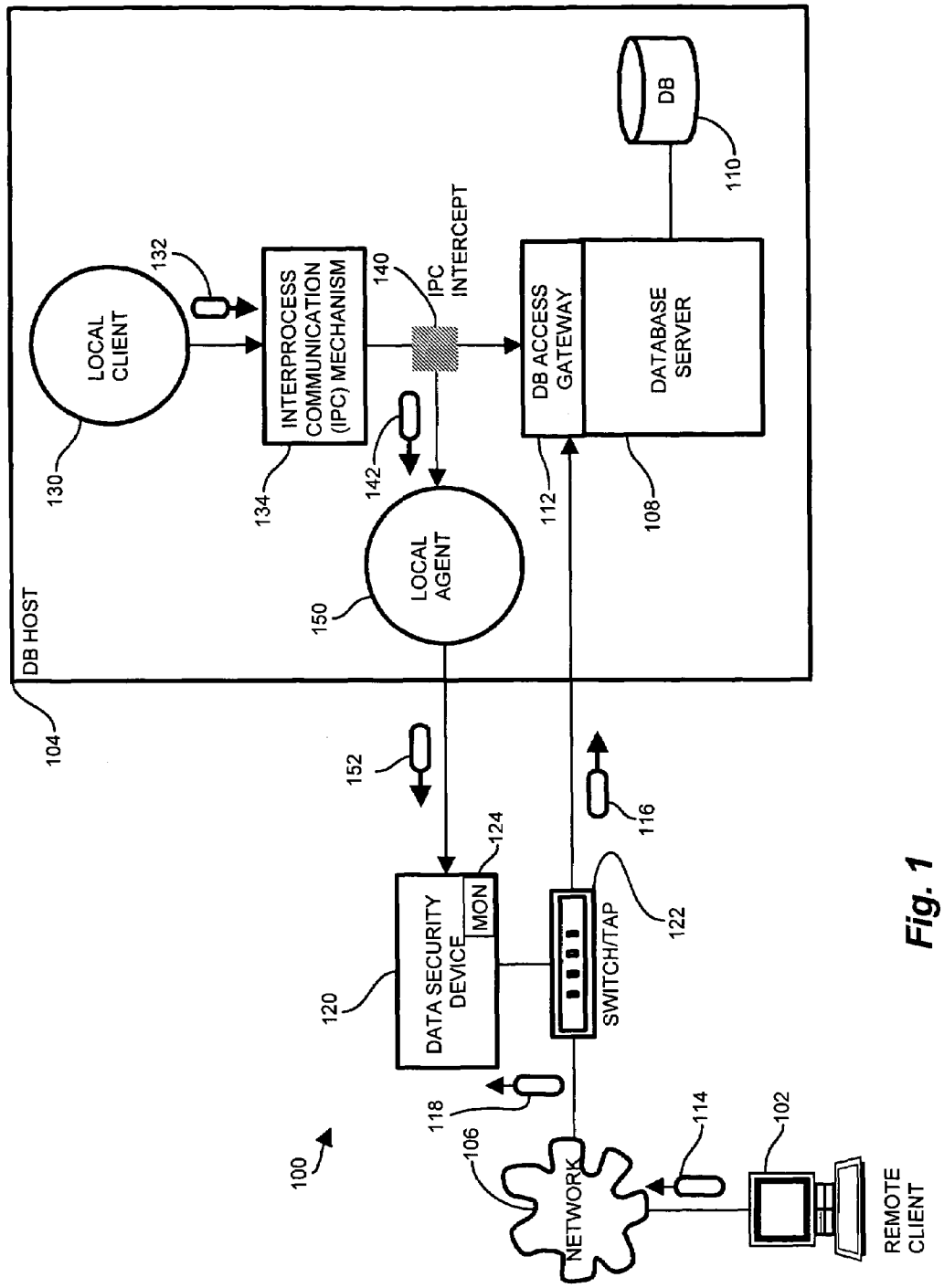
FIG. 1 is a context diagram of a data storage and retrieval environment suitable for use with the present invention.

FIG. 1 is a context diagram of a data storage and retrieval environment suitable for use with the present invention. Referring to FIG. 1, the environment 100 provides a remote user 102 with a database (DB) host 104 for data storage and retrieval operations (DB operations). The user 102 connects to the host 104 via an access network 106, which may be any suitable internetworking infrastructure such as a LAN, intranet, extranet or the Internet. The DB host 104 includes a database server 108 connected to the database 110, typically a disk array or set of mass storage devices such as disk drives. The database 108 includes a DB access gateway 112, which operates as an application programming interface (API) for user 102 access via a variety of access methods, discussed further below.

A user initiates access to the database in the form of a user request 114, which passes through the network 106 for delivery to the DB access gateway 112 as an incoming request 116. A data security device 120 is connected via a switch 122 or other connectivity device such as a tap, router or bridge, on the path from the network 106 to the host 104. The data security device 120 includes a DB monitor 124 for receiving user requests 114 sent through the switch 122. The DB monitor receives and analyzes the incoming user request 114 as a tapped access attempt 118, which the DB monitor 124 analyzes according to a predetermined security or access policy. Such an access policy is discussed in greater detail in copending U.S. patent application Ser. No. 10/762,660 entitled "SYSTEM AND METHODS FOR ADAPTIVE BEHAVIOR BASED ACCESS CONTROL," filed Jan. 22, 2004, incorporated herein by reference. The data security device 120 then passes the tapped access attempt 118 to the access gateway (AG) 112 as an incoming request 116.

Typically, the database server 108 expects a substantial portion of DB traffic (user requests 114) to arrive remotely via the network 106, and thus pass scrutiny under the data security device 120. However, as suggested above, a portion of database access attempts emanate locally from a local client 130, executing on the host 104, as local access attempts 132. The local access attempts 132 arrive at the access gateway 112 via an Interprocess Communication (IPC) mechanism 134. Such local access attempts 132 do not pass through the switch 122, and therefore may otherwise be operable to elude scrutiny of the data security device 120.

Configurations of the invention substantially overcome the above described shortcomings associated with such local clients 130 by employing an IPC intercept 140 for intercepting the local access attempt 132 and transporting the intercepted access attempt 142 to a local agent 150. The local agent 150 determines, by interrogating the IPC mechanism 134, a database instruction 152 corresponding to the local access attempts 132. The local agent 150 then transmits the determined database instruction 152 to the data security device 120 for analysis and further operations by the DB monitor 124. In this manner, the data security device 120 receives all local and remote access attempts 132, 116 to the DB server 108 to more fully analyze, monitor, and guard against access attempts 132, 116 which may be undesirable.

In a typical DB host 104, the local client 130 may employ a variety of IPC mechanisms 134 to transmit local access attempt 132 to the DB server 108. The exemplary configuration discussed below discloses a particular arrangement including shared memory as the IPC mechanism from which to intercept the access attempt 132. Alternate configurations may employ other IPC mechanisms and IPC intercepts 140.

Figure 2:
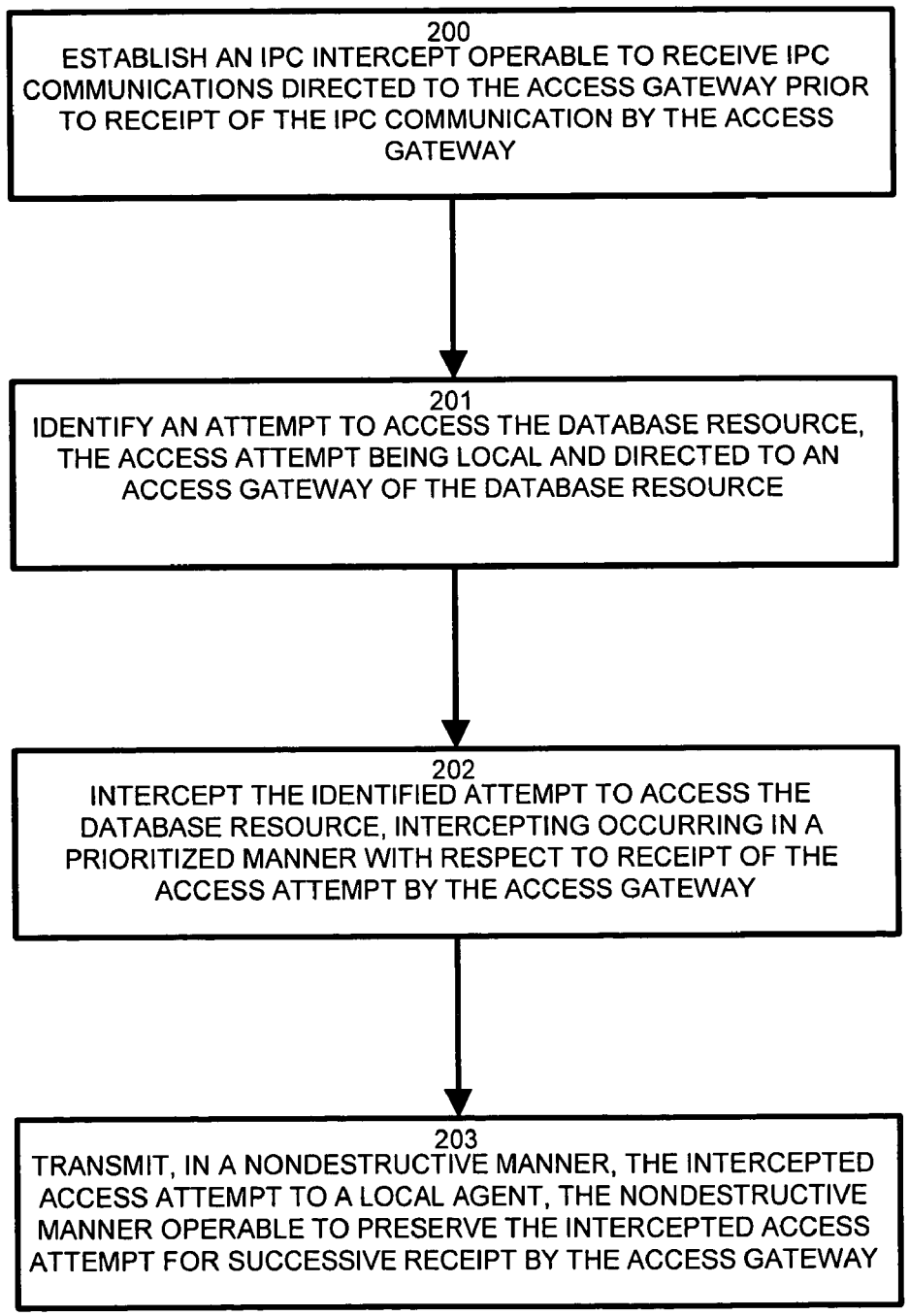
FIG. 2 is a flowchart of interception of access attempts in the system in FIG. 1.

FIG. 2 is a flowchart of interception of access attempts in the system in FIG. 1. Referring to FIG. 2, the exemplary method of monitoring access to a protected database resource, such as a Structured Query Language (SQL) based DBMS system, includes establishing an IPC intercept 140 operable to receive IPC communications directed to the access gateway prior to receipt of the IPC communication by the access gateway, as depicted at step 200.

As indicated above, database management systems (DBMS) often employ IPC mechanisms 134 with a local client 130 on a DB host 104 for transport of the DB commands from the local client 130 to the DB server 108. The IPC intercept 140 interjects itself into the communication path between the local client 130 and the DB access gateway 112 responsive to the DB access attempts 116, 132. The IPC intercept 140 may be implemented in a variety of configurations, depending on the IPC mechanism 134 employed. In the exemplary configuration shown, the IPC mechanism 134 is a shared memory transport mechanism, discussed further below.

The IPC intercept 140 identifies the attempt 132 to access the database resource from the local client 130. Such access attempts are local to the host 104 and directed to an access gateway 112 of the database resource 110, as shown in step 201. The local client 130 initiating the local access 132 typically represents a local DBA account or a local user TELNET access for example. In the exemplary configuration, the majority of the access attempts 116 occur via the front end internet 106 access. The local agent, however, accesses 132 via the so-called "back end" to the DB host 104, which has the effect of avoiding the network data security device 120 by employing the IPC mechanism 134. Both local attempts 132 and remote attempts 116, however, are directed to the DB access gateway 112. Therefore, the local attempts 132 are identifiable by observing IPC communications to the gateway 112.

The IPC intercept 140 intercepts the identified attempt 132 to access the database resource 110, in which intercepting occurring in a prioritized manner with respect to receipt of the access attempt 132 by the access gateway 112, as depicted at step 202. Accordingly, the IPC intercept 140 allows the local agent 150 to capture and divert such a local access attempt 142. In the exemplary configuration, the prioritized receipt of the local access attempt 132 allows the IPC intercept 140 to receive the access attempt 132 before receipt by the DB access gateway 112. The local agent 150 then transmits the intercepted access attempt 152 in a nondestructive manner operable to preserve the intercepted access attempt for successive receipt by the access gateway 112, thereby not precluding the expected receipt of the access attempt by the access gateway 112, as depicted at step 203. Accordingly, by forwarding the access attempt 132 back to the data security device 120, the DB monitor 124 enforces the access policy uniformly for all accesses to the DB server 108.

Figure 3:
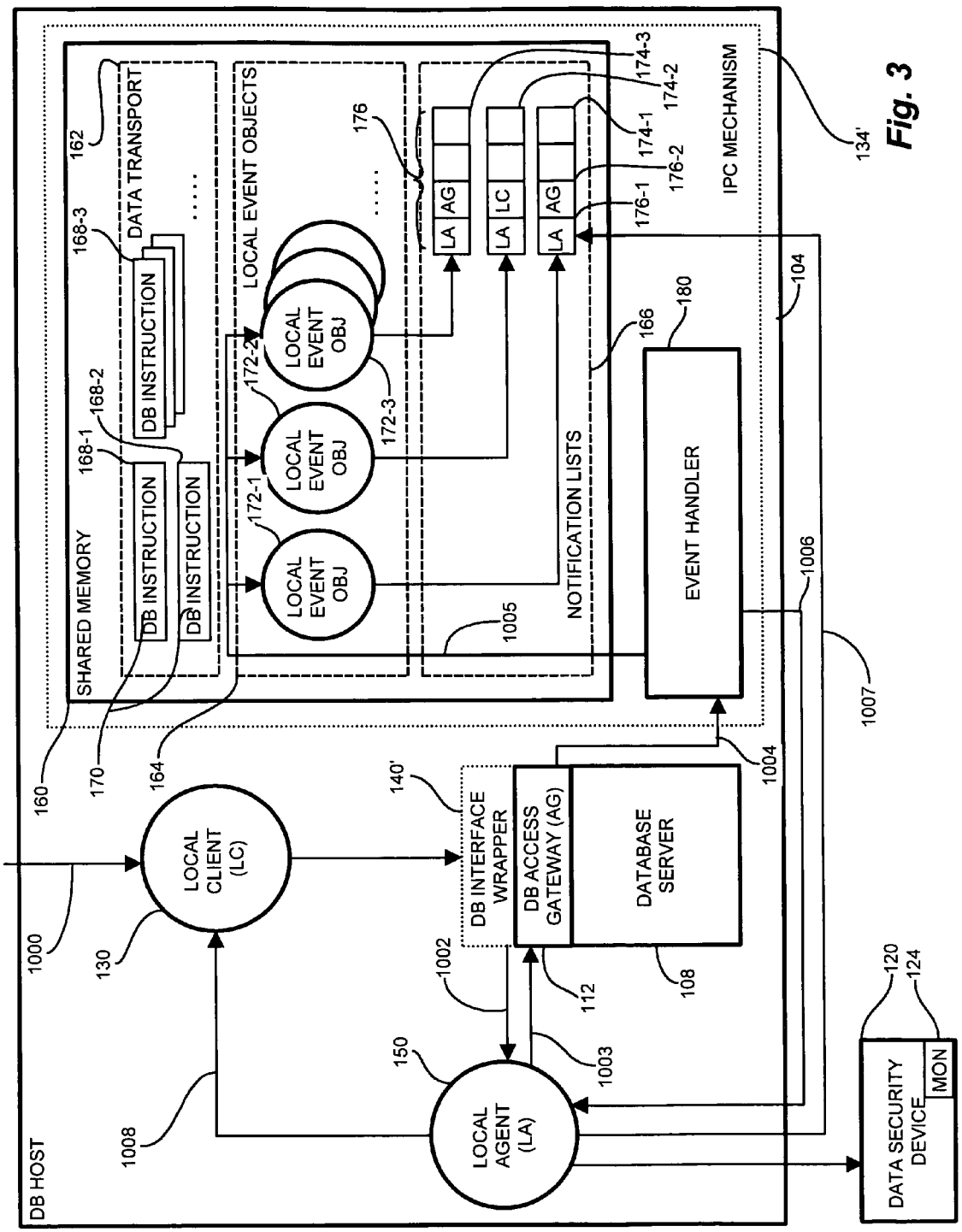
FIG. 3 is a block diagram of establishing an interface wrapper for providing an IPC intercept mechanism in the system of FIG. 1.

FIG. 3 is a block diagram of the local agent 150 establishing an interface wrapper 140' for providing the IPC intercept mechanism 140 in the system of FIG. 1. Referring to FIGS. 1 and 3, FIG. 3 includes an exemplary IPC mechanism 134' in greater detail. The exemplary IPC mechanism 134' is a shared memory configuration operable for transport between the local client 130 and the access gateway 112. The IPC intercept 140 includes a DB interface wrapper 140' which intercepts communications (e.g. database access attempts 132) from the local client 130 and sends them to the local agent 150, as will now be discussed in greater detail.

The local agent 150 establishes the IPC intercept 140 to receive communications from the local client 130 in a prioritized manner before the access gateway 112 receives the same communication. By establishing the IPC intercept 140, the prioritized manner ensures that the IPC 134 mechanism delivers the local access attempt 132 to the local agent 150 as an intercepted access attempt 142, allowing actions to be performed by the local agent 150 before the database server 108 operates on the access attempt 132. In a particular configuration, the IPC intercept 140 may operate in a blocking manner so as to selectively restrict the receipt by the access gateway 112 according to the local agent 150.

In the exemplary configuration shown in FIG. 3, the local client 130 employs shared memory 160 as the IPC mechanism 134' for communication with the access gateway 112. In a typical DB server 108, the DB access gateway 112 is a DB vendor specific API which is common to the various transport protocols which transport access attempts 116, 132 to the database server 108. In the exemplary configuration, the access gateway 112 provides a common access point for DB access attempts. The access gateway 112, therefore, receives the access requests into the database, for both local and remote accesses. The local access attempts 132 delivered by the shared IPC mechanism 134' therefore perform access via the gateway 112. The DB interface wrapper 140' provides the IPC intercept 140 for the shared memory IPC mechanism 134. The shared memory IPC mechanism 134' includes the shared memory 160 subdivided into a data transport portion 162, a local event objects portion 164, and a notification lists portion 166.

The shared memory IPC mechanism 134' operates, generally, via the data transport portion 162 of shared memory which is accessible to both the sender and receiver of the communication. In the present example, the communication is the database instruction 170 and the sending and receiving entities are the local client 130 and the access gateway 112, respectively. A signaling mechanism operates in conjunction with an event handler 180 to synchronize the IPC passing of the instruction 170. The event handler 180 associates an event with the expected types of database instructions 170. Interested entities, such as the IPC receiver, subscribe to an event. Similarly, a transmitting entity publishes the event after writing the IPC communication (instruction) to the data transport portion 162. The event handler 180 invokes subscribed entities upon publication of an event. The invocation identifies the signaled command and the location of the DB instruction 170 in the data transport portion 162. The subscribed (registered) recipient then retrieves the DB instruction 170 from the data transport portion 162.

The data transport portion 162 includes a set of intercept registers 168-1.168-3 (168-N, generally) for receiving and storing DB instructions 170 from the local access attempts 132. The intercept registers 168-N may be a buffer area or other memory structure for storing the DB instructions 170 for accessing the database 110. In the exemplary configuration, the DB instruction 170 is a SQL command for execution (performance) by the DB server 108. The local event objects 164 portion includes local event objects 172-1.172-3 (172-N, generally) corresponding to database operations requested by the local access attempts 132. Each of the local event objects 172-N corresponds to a particular DB operation, including, by way of example only, CLIENT_WRITE_POSTED, CLIENT_READ_POSTED, SERVER_WRITE_POSTED, and SERVER_READ_POSTED.

Each of the local event objects 172-N has a corresponding notification list 174-1.174-3 (174-N generally) in the notification lists 166 portion. Note that the shared memory IPC intercept mechanism 134' may, in alternate configurations, be replaced with another IPC intercept 140. In such a configuration, the DB interface wrapper 140' is similarly set up to receive IPC communications in a prioritized manner, prior to receipt by the access gateway 112. The notification lists 174-N include entries 176 specifying a prioritized list of notifications to be made when the DB operation corresponding to the local event object 172 occurs in a local access attempt 132. In the typical IPC communication, the local client 130 writes the DB instruction 170 to an intercept register 168-N, and notifies the event handler 180 of the write.

The event handler 180 activates the local event object 172 corresponding to the written instruction 170, and the local event object 172-N traverses the corresponding notification list 174-N. The local client 130, therefore, establishes the DB interface wrapper 140' by modifying the notification lists 174-N entries 176 to store the local agent 150 LA as the first object to receive the notification of a DB instruction 170 being written to an intercept register 168-N. In order to modify the notification lists 174, the local agent 150 listens for a DB connect request from the local client 130, as will be described in further detail below with respect to FIGS. 5-6. The DB interface wrapper 140' represents a modified DLL which replaces the standard shared memory DLL, such as that provided by Netlib or other common library. The modified DLL replaces, or spoofs, the access gateway 112 as the recipient of the local access attempts 132, described in further detail with respect to FIGS. 7-8 below.

Figure 4:
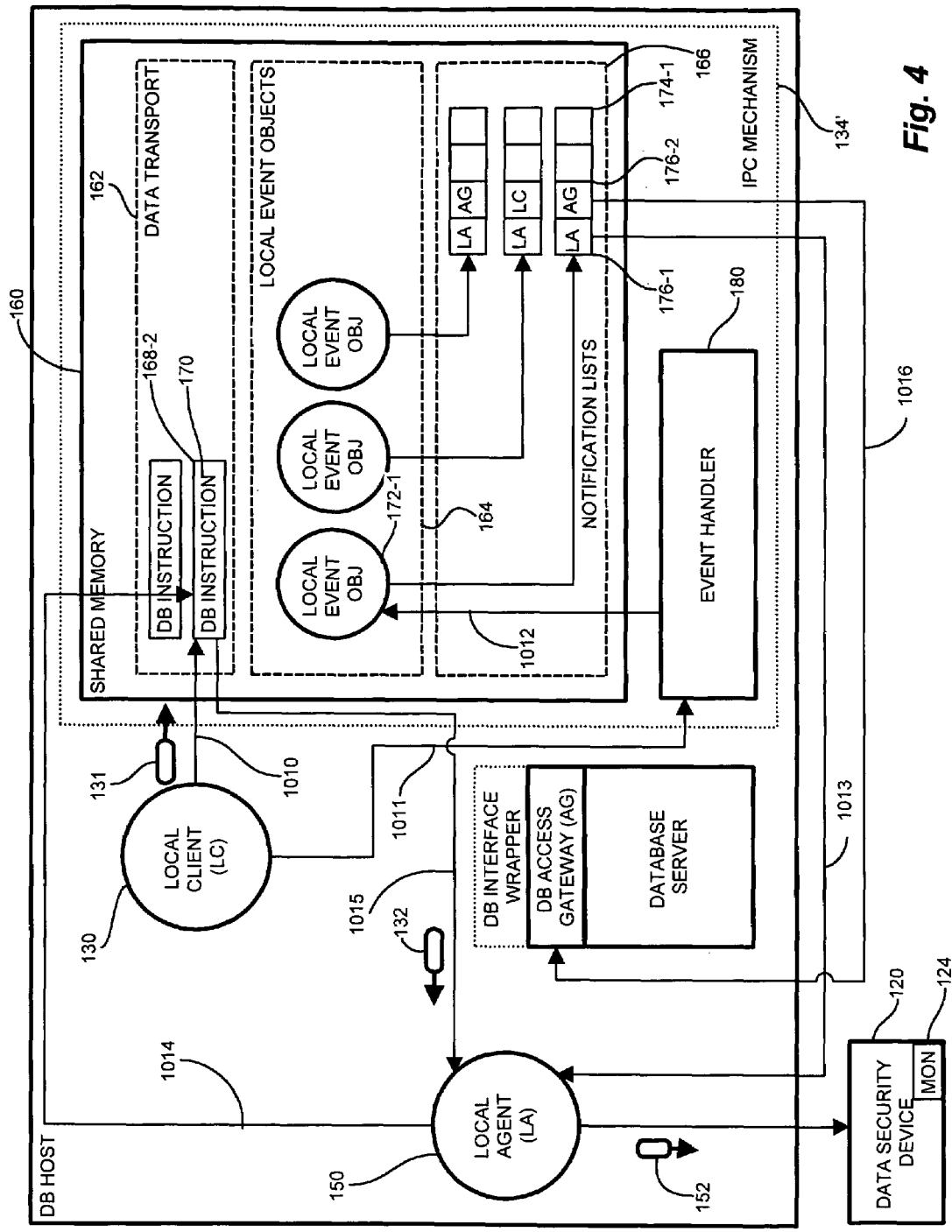
FIG. 4 is a block diagram of intercepting an access attempt via the interface wrapper established in the system of FIG. 3.

FIG. 4 is a block diagram of intercepting an access attempt 132 via the interface wrapper 140' established in the system of FIG. 3. Referring to FIGS. 1 and 4, the interface wrapper is operable to intercept the IPC based transmission containing the DB access attempt 132 from the local client 130 prior to receipt by the DB server 108 via the access gateway 112. In the exemplary configuration illustrated in FIG. 4, the IPC mechanism 134' is a shared memory 160 mechanism and the local agent 150 intercepts the DB access attempt 132 from the shared memory 160.

The IPC intercept 140 from shared memory 160 employs the elements shown in FIG. 4, now summarized briefly and discussed in greater detail below with respect to FIGS. 8-9. Note that FIG. 4 discloses an exemplary IPC interception 140 and alternate configurations may employ interception mechanisms of other IPC mechanisms. The local client 130 stores the DB instruction 170 included in the access attempt 132 in the instruction register 168-2, in the data transport portion 162 of the shared memory 160, shown as message 131. The local client 130 publishes an event attesting to the DB instruction 170 write, and the event handler 180 receives the publication. In response, the event handler 180 commences invocation of subscribed entities 176 by signaling a corresponding local event object 172-N for servicing the published event by processing the corresponding notification lists 174. Accordingly, the event handler 180 finds the local agent 150 as the first listed subscriber 176 to the event, and notifies the local agent 150 accordingly.

Figure 5:
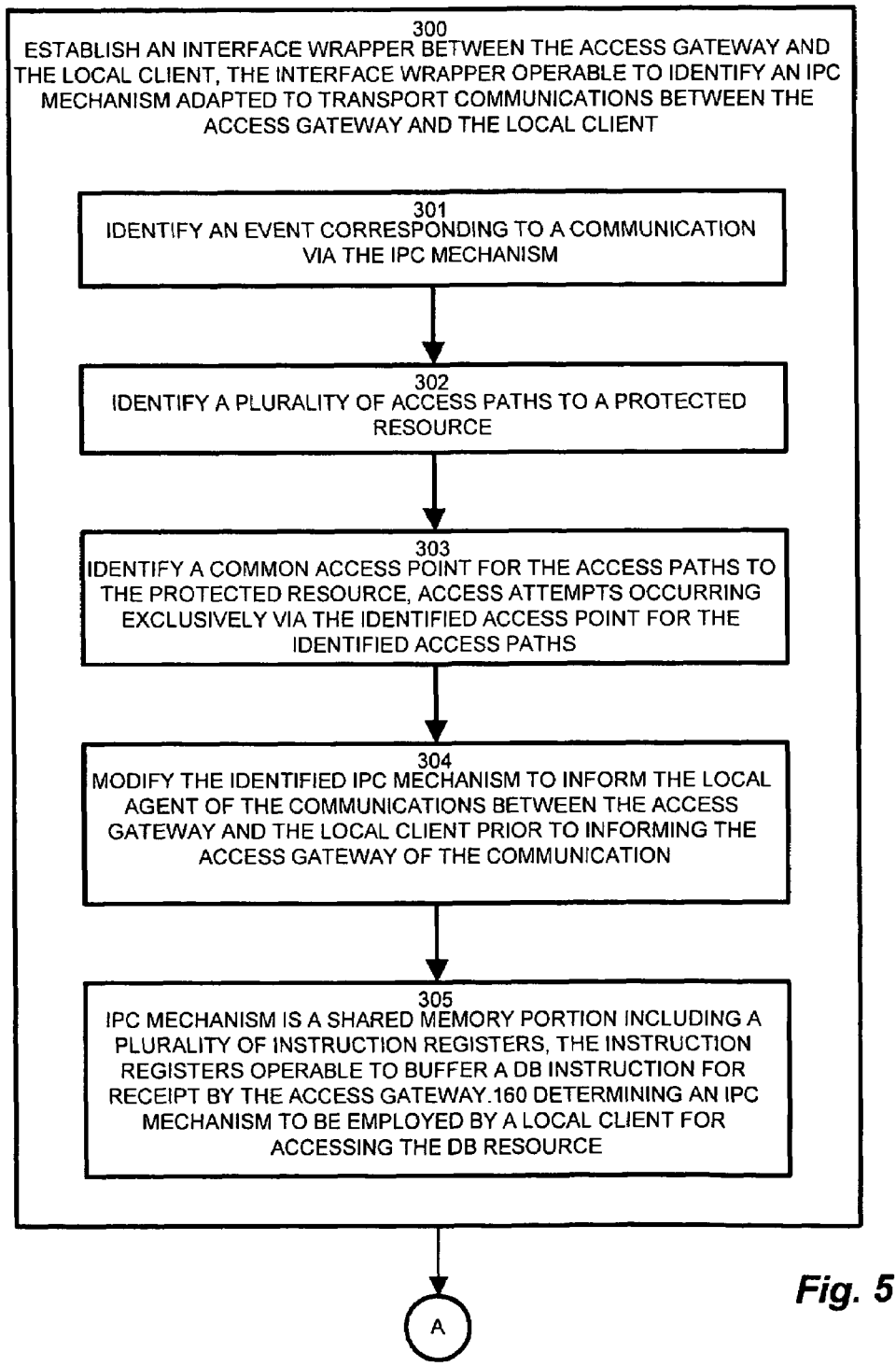
FIGS. 5-6 are a flowchart for establishing an interface wrapper IPC interception mechanism in the system of FIG. 3.
Figure 6:
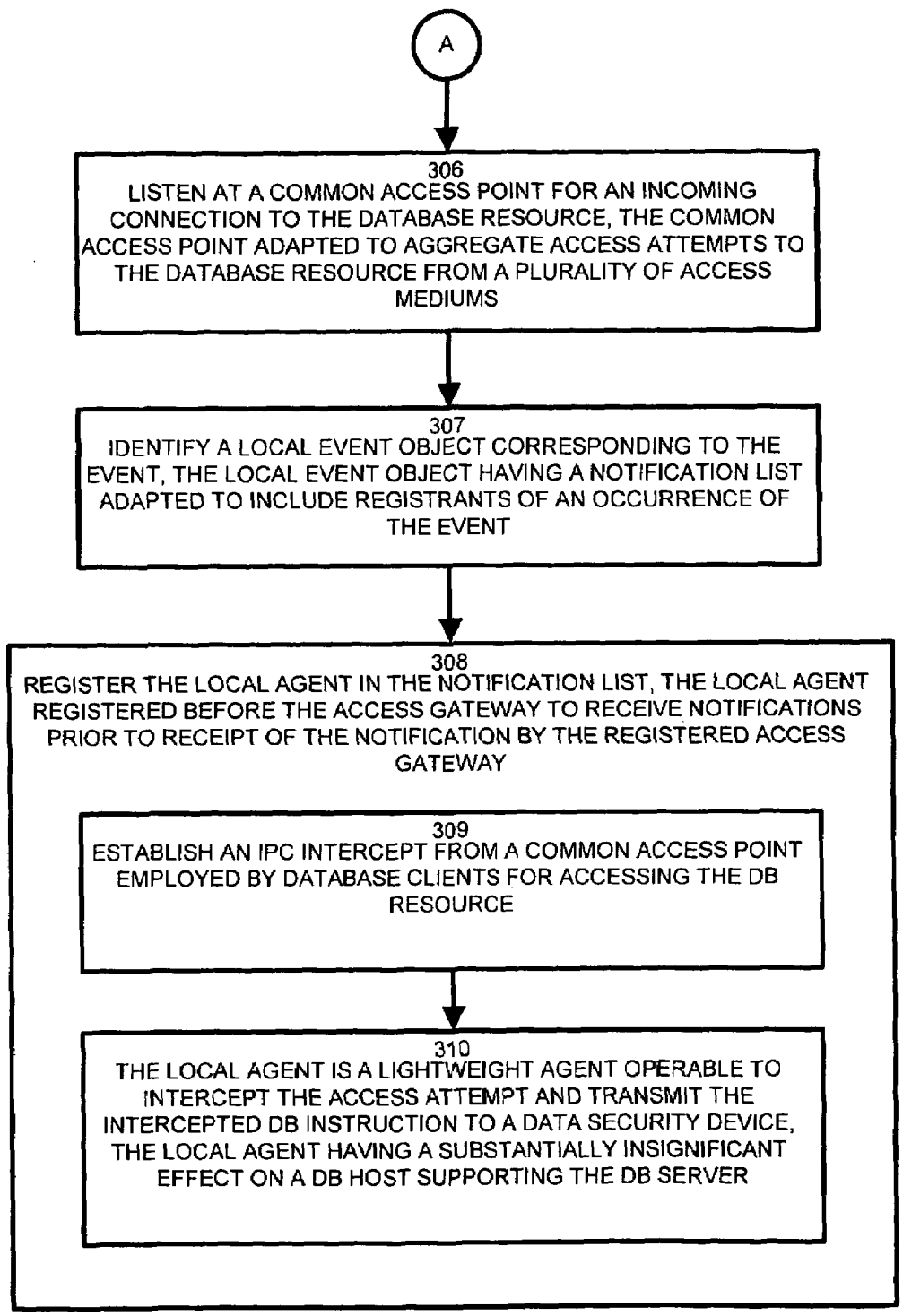
Figure 7:
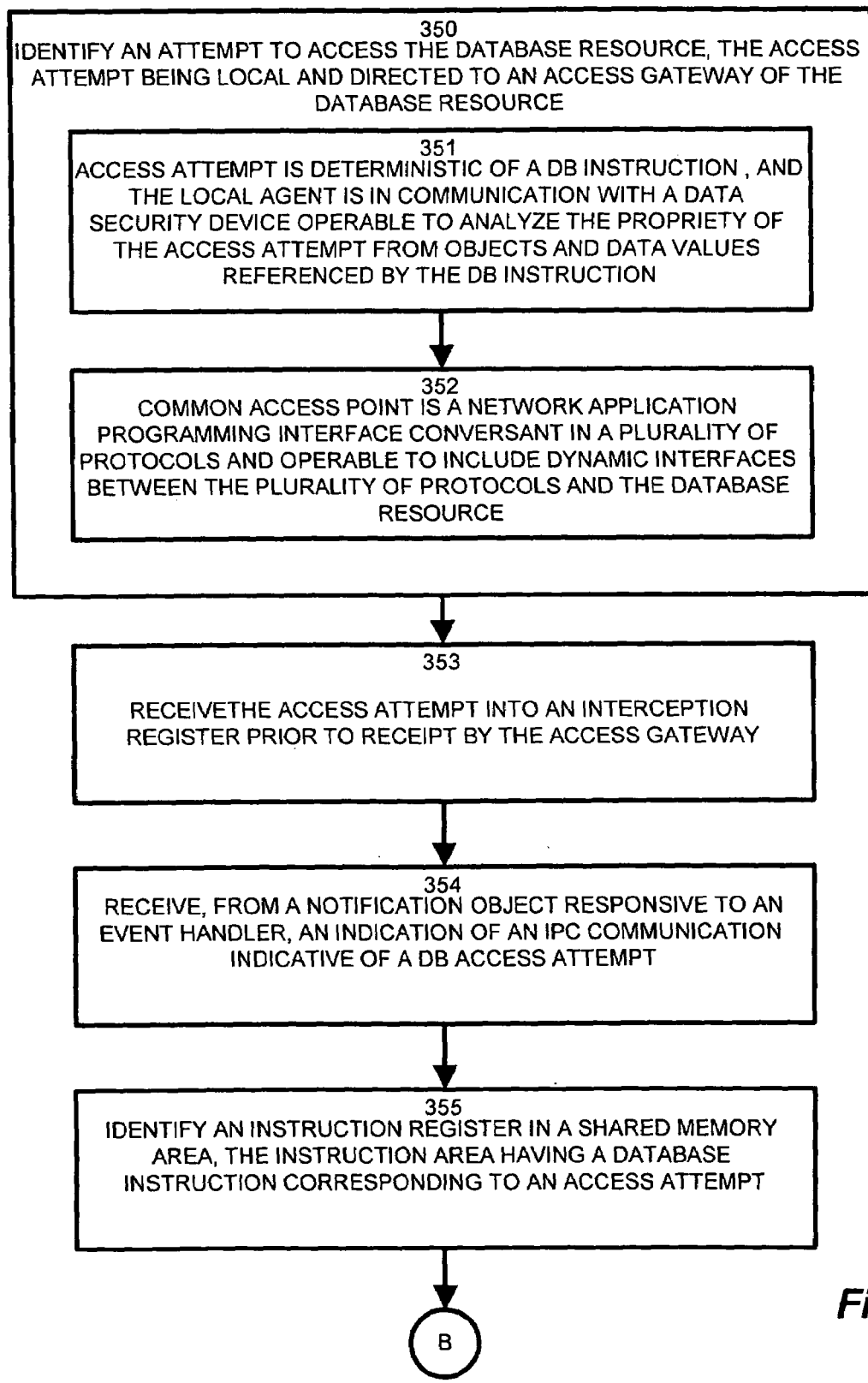
FIGS. 7-8 are a flowchart for intercepting an access attempt via the IPC interception mechanism in the system of FIG. 4.

FIGS. 5-6 are a flowchart for establishing an interface wrapper 140' IPC interception mechanism in the system of FIG. 3 in greater detail. FIGS. 5 and 6 disclose the sequence for defining and establishing the exemplary IPC intercept mechanism 140' for intercepting access attempts 132 by the data security device 120, shown in the block diagram of FIG. 3, above. FIGS. 7 and 8 disclose the sequence for intercepting the access attempts 132 employing the established mechanism 140', shown in the block diagram of FIG. 4, above. Referring to FIGS. 3, 5 and 6, prior to identifying the access attempt 132, the local agent 150 or other initialization agent establishes the IPC intercept 140 operable to receive IPC communications directed to the access gateway 112 prior to receipt of the IPC communication by the access gateway 112. The local agent 150 therefore establishes an interface wrapper 140' between the access gateway 112 and the local client 130, in which the interface wrapper 140' is operable to identify the IPC mechanism 134' adapted to transport communications between the access gateway 112 and the local client 130, as depicted at step 300.

In the exemplary configuration, the IPC mechanism 134 is the shared memory 160 transport mechanism. The shared memory 160 transport mechanism includes a set of events and corresponding subscribers and publishers. The set of events corresponds to IPC operations, such as CLIENT_WRITE_POSTED, CLIENT_READ_POSTED, SERVER_WRITE_POSTED, and SERVER_READ_POSTED. Interested objects (i.e. the local agent 150) subscribe to the events, meaning that such objects are to be informed upon event occurrence. Objects performing the IPC actions publish the event upon completion. Further, either the access gateway 112 (i.e. on behalf of server 108) or the local client 130 may publish an event. Each event has a corresponding local event object 172-1 . . . 172-3 (172-N, generally). The local event object 172-N maintains a notification list 174-1 . . . 174-3 of entries 176 indicative of an ordered list of subscribers, or objects, to notify. The event handler 180 receives event publications, and informs the local event object 172-1 . . . 172-3 to notify the subscribers included in the corresponding notification list 174-N.

Accordingly, establishing the interface wrapper 140' for the IPC intercept 140 further includes identifying an event corresponding to a communication via the IPC mechanism 134, or shared memory 160 in the exemplary configuration, as depicted at step 301. The local agent 150 then identifies a plurality of access paths to the protected database resource 110, as shown at step 302. In the exemplary configuration, remote access occurs via the network 106 through the switch 122. Local accesses occur via the IPC mechanism 140 of the local client 130, which is shared memory 160 in the exemplary configuration shown. Therefore, the IPC intercept 140 is to perform the interception from shared memory 160.

In order to isolate all access attempts 132, 116 into the DB server 108, the local agent 150 identifies a common access point for the access paths to the protected DB resource 110, in which the access attempts 132, 116 occur exclusively via the identified common access point for the identified access paths, i.e. switch 122 and local client 130, as depicted at step 303. In the exemplary configuration shown in FIG. 3, the access route to the database server 108 is the DB access gateway 112. Identification of such a common access point 112 provides assurances that complete coverage of access to the database 110 is provided. Alternate configurations may provide alternate or additional access routes which the IPC intercept mechanism 140 also covers.

In the exemplary configuration, the DB access gateway 112 is implemented as a general API, which implements a suite of common access invocation points from various transport mechanisms to provide a single unified API for DB access. The common API operates via a set of Dynamic Linked Libraries (DLLs) conforming to each expected transport medium transporting access attempts 116, 132. Typical transport mediums include TCP/IP, shared memory, Banyan Vines, Named Pipes, ports and sockets, and may include others as the implementation dictates. In certain configurations, as indicated above, a Netlib suite is employed by certain vendors and provides a database 110 specific interface conformant to the various DLLs, but which may differ between DB vendors, also common in the art. Therefore, accesses to a particular DB 110 occur via the DB server 108 and the access gateway 112 configured for the database 110. In this manner the access gateway 112 provides a common access point for the DB server 108.

Upon identifying the common access point, the local client 130 identifies the IPC mechanism 140 to inform the local agent 150 of the communications between the access gateway 112 and the local client 130 prior to informing the access gateway 112 of the communication 132, as depicted at step 304. In the exemplary configuration, the local client 130 therefore identifies shared memory as the IPC mechanism 134 from which to establish the IPC intercept 140. The shared memory 160 includes the data transport portion 162, which has instruction registers 168-N for storing, or buffering, the DB instruction 170 in the data access attempt 132. Therefore, the local agent 150 determines, at step 305, that the IPC mechanism 134' includes a shared memory portion 162 including a plurality of instruction registers 168-N, in which the instruction registers 168-N are operable to buffer a DB instruction 170 for receipt by the access gateway 112.

Identifying the access attempt 132 further includes listening, at the common access point 112, for an incoming connection to the database resource 110. Accordingly, the local agent 150 listens for a connection attempt from the local client 130, as depicted at step 306. A local user initiates a connection attempt via the local client through a telnet request, for example, or other transport mechanism on the Db host 104, as shown by message 1000. The local client 130 issues a connect request 1001, and the listening local agent 150 receives the connect request 1002 instead of the access gateway 112 because the access gateway 112 is the common access point for the DB 110 and the local agent 150 replaces the default DLL with the interface wrapper 140. The local agent 150 then forwards the connect request to the access gateway via message 1003, which indicates the local agent 150 as the responsive entity to receive the acknowledgement indicative of the local event objects 172-N, for reasons which will be made apparent below.

Having received the connect request 1003, the access gateway 112 processes the connection by directing the event handler 180 to establish local event objects 172-N for the various IPC operations which the local client 130 and the access gateway 112 may employ, via message 1004. Accordingly, the event handler 180 instantiates the local event objects 172-N and corresponding notification lists 174-N, as shown by message 1005.

The event handler 180 then notifies the originator of the connect request message 1003, in this case the local agent 150 effectively spoofing the local client 130, of the identity of the local event objects 172-N for use as the IPC mechanism 134,' shown by message 1006. The message 1006 allows the local agent 150 to identify the local event object 172-1 corresponding to the event, as depicted at step 307. The local event object 172-1, for example, has a notification list 174-1 adapted to include registrants 176 of an occurrence of the event. Since the local agent 150 receives the identity message 1006 before the local client 130, the local agent 150 may subscribe as the first entry 176-1 in the relevant notification list 174-1.

Accordingly, using the identity from the message 1006, the local agent 150 subscribes to the first notification entry 176-1 in the notification lists 174-N, as shown by message 1007. The local agent 150 then forwards the identity message 1005 back to the expecting local client 130 as message 1008, which also employs the identity information of the local event object 172-1 to allow the local client 130 to subscribe via the notification lists 174-1 as entry 176-2. For example, the local agent 150 selects a CLIENT_WRITE_POSTED event as indicative of the local access attempt 132. Other events may also be selected as indicative of incoming local access attempts 132.

At the time that the event handler 180 registers the access gateway 112 in the notification lists 174-1 as entry 176-2, the local agent 150 is registered before the access gateway 112 to receive notifications prior to receipt of the notification by the subscribed access gateway 112, as shown at step 308. Therefore, by interjecting itself into the acknowledgement path between the access gateway 112 and the local client 130, the local agent 150 ensures that the first subscription notification entry 176-1 is the local agent 150, permitting the local client (LC) 130 or access gateway (AG) 112 to obtain the second or successive entries 176. Note that the above described example illustrates ingress communication to the DB server 108. Accordingly, depending on the direction of the IPC communication, either the local client LC or the access gateway AG may be listed in the notification entries 176-N. The local agent LA stores the first notification entry 176-N in the manner just described to ensure the operation of the interface wrapper 140'.

In this manner, the local agent establishes the interface wrapper 140' as the exemplary IPC intercept 140 from the common access point (i.e. access gateway 112) employed by database clients 102 for accessing the DB resource, as depicted at step 309. In particular configurations, the local agent 150 is a lightweight agent operable to intercept the access attempt and transmit the intercepted DB instruction to a data security device, the local agent 150 having a substantially insignificant effect on a DB host 104 supporting the DB server 108, as disclosed at step 310.

It should be noted that the event signaling occurring in the shared memory IPC mechanism 140' is typically specific to the access gateway 112 implementation, the DB vendor, and the incoming transport mechanism. In the exemplary configuration shown, the incoming transport mechanism is a shared memory IPC, and the DB is a SQL relational database such as an Oracle® database. Accordingly, the anticipated signaling occurring as an incoming access attempt 132 arrives occurs internally between the IPC mechanism 134, the event handler 180, and the access gateway 112. Runtime observation, typically employing runtime analysis tools for object and message examination, is employable to obtain the signaling information and identification of the local event objects 172-N corresponding to the signaled (i.e. published and subscribed) events. One such debugging tool is WinObj, known to those of skill in the art. Other tools and runtime evaluation methods may also be employed.

Figure 8:
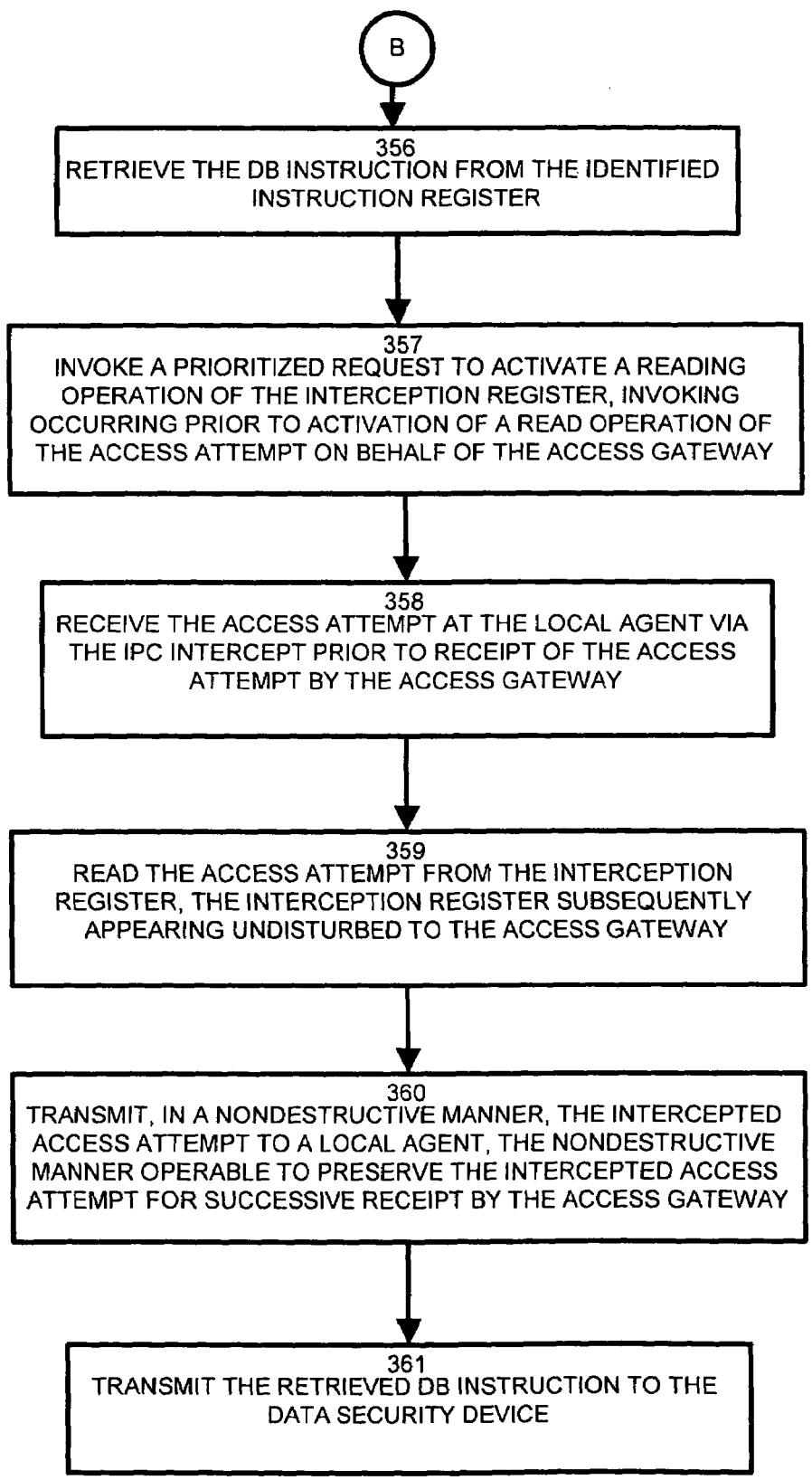

FIGS. 8-9 are a flowchart for intercepting an access attempt via the IPC interception mechanism in the system of FIG. 4, employing the DB interface wrapper 140' discussed above in FIGS. 6-7. Referring to FIGS. 1, 4, 8 and 9, the method of monitoring access to a protected database resource 110 includes identifying an local user attempt to access the database 110, directed to the access gateway 112, as disclosed as step 350. The identified access attempt 132 is indicative of a DB instruction 170, as depicted at step 351 and shown as message 1010. As indicated above, the common access point provided by the access gateway 112 is a network application programming interface, conversant in a plurality of protocols and operable to include dynamic interfaces between the plurality of protocols and the database resource, as depicted at step 352. Such protocols may include, but are not limited to, TCP/IP, shared memory, Banyan Vines, Named Pipes, ports and sockets.

The access attempt 132 is indicative or inclusive of a DB instruction 170, as depicted at step 352. In this manner, the interception register 168-2 in the data transport portion 162 of the shared memory 160 receives the identified attempt to access the database 110 into the interception register 168-2 prior to receipt of the access attempt 132 by the access gateway, as depicted at step 353.

The local client 130 identifies the event associated with the DB instruction (operation) 170 written to the instruction register 168-2, and publishes the event accordingly, as shown by message 1011. The event handler 180 is responsive to the published event and invokes the local event object 172-1 responsible for notifying subscribers to the published event, as shown by signaling message 1012. Accordingly, the responsive local event object 172-1 initiates traversal of the corresponding notification list 174-1. As indicated above, the local agent 150 LA occupies the first entry 176-1 in the notification list 174-1, and accordingly, receives a signaling message 1013 from the notification object 174-1 responsive to an event handler 180, as an event corresponding to an IPC communication indicative of a DB access attempt, as depicted at step 354. Responsive to the signaling message 1013, the local agent 150 identifies the instruction register 168-2 in the shared memory portion 162 containing the database instruction 170 corresponding to the access attempt 1014, as disclosed at step 355.

The local agent 150 retrieves the DB instruction 170 from the identified instruction register 174-1, as depicted at step 356, and therefore invokes a prioritized request to activate a reading operation of the interception register 168-2, invoking occurring prior to activation of a read operation of the access attempt 132 on behalf of the access gateway 112, as depicted at step 357. The local agent 150 retrieves the instruction 170, shown as signaling 1015, from the register 168-2 immediately after having received the signaling message 1013. The agent copies, but does not change or modify, the pending instruction. Accordingly, a successive signaling message 1016 to the access gateway 112 based on the second entry AG 176-2 occurs following the retrieval, thus the local agent receives the access attempt 132 via the IPC intercept 140 prior to receipt of the access attempt 132 by the access gateway 112, as shown at step 358. Therefore, the interception register 168-2 subsequently appears undisturbed to the access gateway 112, as shown at step 359.

The copied instruction 170 representing the intercepted access attempt 132 is transmitted, in a nondestructive manner to the local agent in which the nondestructive manner operable to preserve the intercepted access attempt for successive receipt by the access gateway 112, as depicted at step 112. The local agent 150 then transmits the retrieved DB instruction 170 to the data security device 120 as message 152 for successive analysis and processing according to the security policy implemented by the DB monitor 124. In this manner, all local and remote access attempts 132, 116 pass through the data security device under scrutiny of the DB monitor 124.

In alternate configurations, the local agent 150 performs a blocking access to the interception registers 168-N. The blocking access allows the data security device 120 to return an access decision, rather then unintrusively processing the DB instruction 170. Accordingly, the data security device 120 is operable to prevent access to the DB 110 if the data security device 120 computes a negative access decision.

The method of monitoring access to a protected database resource disclosed herein may encompass a variety of alternate deployment environments. In a particular configuration, the exemplary adaptive behavior based access control application discussed herein may be the SQL Guard application, marketed commercially by Guardium corporation of Waltham, Mass., assignee of the present application.

Those skilled in the art should readily appreciate that the programs and methods for monitoring access to a protected database resource as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for monitoring access to a protected database resource has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. An encoded set of processor based instructions on a computer readable storage medium that, when executed in a computer having the processor, cause the computer to perform a method of monitoring access to a protected database resource comprising:

identifying an attempt to access the database resource, the access attempt being local and directed to an access gateway of the database resource;

identifying a plurality of access paths to the protected database resource;

intercepting the identified attempt to access the database resource, intercepting occurring in a prioritized manner with respect to receipt of the access attempt by the access gateway, intercepting further comprising:

determining an interprocess communication (IPC) mechanism to be employed by a local client for accessing the database resource, the IPC mechanism defined by a dynamic linked library (DLL);

identifying, via a common access point for the access paths to the protected database resource, access attempts occurring via identified access point for the identified access paths, identifying the access attempts including:

replacing the defined DLL for database access with an interface wrapper, the interface wrapper for identifying a local agent as a responsive entity for database calls such that the interface wrapper spoofs the database access gateway as an entity responsive to database access attempts, the interface wrapper thus defining an IPC intercept for receiving database connection attempts prior to receipt by the database access gateway; and establishing, in response to an identified connection attempt, an event notification list responsive to database access attempts using an identified connection;

establishing an IPC intercept from the common access point employed by database clients for accessing the database resource by storing, in the event notification list, the local agent as first entity to receive control from a database access attempt via the identified connection, the event notification list operable to initiate handlers responsive to event;

receiving the access attempt at the local agent via the IPC intercept prior to receipt of the access attempt by the access gateway; and transmitting, in a nondestructive manner, the intercepted access attempt to the local agent, the nondestructive manner operable to preserve the intercepted access attempt for successive receipt by the access gateway.

2. The method of claim 1 wherein the access attempt is deterministic of a DB instruction, and the local agent is in communication with a data security device operable to analyze the propriety of the access attempt from objects and data values referenced by the DB instruction.

3. The method of claim 2 wherein transmitting further comprises rerouting the intercepted access attempts to the data security device, the data security device operable to offload data security decisions as a consolidated appliance, the offloaded data security decisions relieving the host from processing the data security decisions.

4. The method of claim 1 wherein intercepting in a prioritized manner further comprises:
receiving the access attempt into an interception register prior to receipt by the access gateway;
invoking a prioritized request to activate a reading operation of the interception register, invoking occurring prior to activation of a read operation of the access attempt on behalf of the access gateway; and
reading the access attempt from the interception register, the interception register subsequently appearing undisturbed to the access gateway.

5. The method of claim 1 further comprising, prior to identifying the access attempt, establishing an IPC intercept operable to receive IPC communications directed to the access gateway prior to receipt of the IPC communication by the access gateway.

6. The method of claim 1 wherein identifying the access attempt further comprises listening, at a common access point, for an incoming connection to the database resource, the common access point adapted to aggregate access attempts to the database resource from a plurality of access mediums.

7. The method of claim 1 wherein the local agent performs rerouting of local access attempts in a lightweight manner such that the data security device is operable to receive local and remote access attempts, wherein security coverage of the DB server for network and local access attempts occur via a common appliance.

8. The method of claim 1 wherein intercepting further comprises:
receiving, from a notification object responsive to an event handler, an indication of an IPC communication indicative of a DB access attempt;
identifying an instruction register in a shared memory area, the instruction register having a database instruction corresponding to the access attempt;
retrieving the DB instruction from the identified instruction register; and
transmitting the retrieved DB instruction to the data security device.

9. The method of claim 1 further comprising:
establishing an interface wrapper between the access gateway and the local client, the interface wrapper operable to identify an IPC mechanism adapted to transport communications between the access gateway and the local client; and
modifying the identified IPC mechanism to inform the local agent of the communications between the access gateway and the local client prior to informing the access gateway of the communication.

10. The method of claim 9 wherein the IPC mechanism is a shared memory portion including a plurality of instruction registers, the instruction registers operable to buffer a DB instruction for receipt by the access gateway.

11. The method of claim 1 wherein the local agent is a lightweight agent operable to intercept the access attempt and transmit the intercepted DB instruction to a data security device, the local agent avoiding analyzing the access attempt on a DB host supporting the DB server.

12. The method of claim 1 wherein intercepting further comprises
blocking the intercepted access attempt from receipt by the access gateway, and selectively unblocking the access attempt depending on a data security decision indicative of the propriety of the access attempt.

13. The method of claim 12 further comprising:
computing the data security decision at the data security device; and
transmitting the data security decision to the local agent, the local agent operable to permit receipt of the access attempt by the DB server.

14. The method of claim 13 wherein the data security decision further comprises: selectively logging and blocking the access attempt, the data security decision including processing selected from the group consisting of firewalls, filters, intrusion detectors, alarms, alerts, tunneling and passwords.

15. The method of claim 9 wherein establishing the interface wrapper further comprises:
identifying an event corresponding to a communication via the IPC mechanism;
identifying a local event object corresponding to the event, the local event object having a notification list adapted to include registrants of an occurrence of the event; and
registering the local agent in the notification list, the local agent registered before the access gateway to receive notifications prior to receipt of the notification by the registered access gateway.

16. An encoded set of processor based instructions on a computer readable storage medium that, when executed in a computer having the processor, cause the computer to perform a method for controlling local access to a database comprising:
identifying a local access gateway to the database, the access gateway being a common access point into the database;
establishing an interception wrapper between a local client and the access gateway, establishing the interception wrapper further comprising:
identifying, at least one interprocess communication (IPC) operation, each of the identified IPC operation corresponding to an event, the event derived from a database instruction, the IPC operation defined by a dynamic linked library (DLL);

replacing the defined DLL for database access with an interface wrapper, the interface wrapper for identifying a local agent as a responsive entity for database calls such that the interface wrapper spoofs the database access gateway as an entity responsive to database access attempts, the interface wrapper thus defining an IPC intercept for receiving database connection attempts prior to receipt by the database access gateway; and establishing, in response to identified connection attempt, an event notification list responsive to database access attempts using identified connection;

instantiating a local event object corresponding to the event, the local event object having a notification list indicative of notifications of an object to be made upon an occurrence of the event; and storing, in the event notification list, the local agent as first entity to receive control from a database access attempt via the identified connection, the event notification list operable to initiate handlers responsive to the event;

intercepting, via the interception wrapper, an access attempt from a local client prior to receipt of the access attempt by the access gateway, the access attempt indicative of a pending database instruction in an IPC buffer;

identifying the local event object corresponding to the access attempt;

indexing the notification list corresponding to the identified local event object;

traversing the indexed notification list, the notification list including entries of notifications to be performed upon occurrence of the event;

reading a traversed entry corresponding to the local agent, the entry indicative of the location of the local agent;

notifying the local agent using the read location of the local agent;

retrieving, in response to the notification, the database instruction from the IPC buffer;

transmitting the retrieved database instruction from the IPC buffer to a data security device operable to analyze the propriety of the database instruction;

reading a successive traversed entry corresponding to the access gateway, the entry indicative of the location of the access gateway; and notifying, after the notifying of the local agent, the access gateway of the IPC event occurrence using the read location of the access gateway.

17. The method of claim 16 wherein establishing the interception wrapper further comprises:

storing, in a successive position in the notification list, an indication of the access gateway, the access gateway operable to employ the IPC event for database instructions.

18. The method of claim 16 wherein the interception wrapper is operable to receive interprocess communication signaling between the local client and the access gateway, and intercepting further comprises:

receiving, by the interception wrapper, a signaling message to the access gateway;

processing the signaling message to identify an DB instruction in the register; and passing the signaling message in a nondestructive manner to the access gateway.

19. A local agent stored on a computer readable storage medium having an encoded set of processor based instructions that, when executed by a processor responsive to the instructions, performs steps for monitoring access to a protected database resource comprising:

an interface operable to identify an attempt to access the database resource, the access attempt being local and directed to an access gateway of the database resource, the access attempt being deterministic of a database instruction, a local agent being in communication with a data security device operable to analyze the propriety of the access attempt from objects and data values referenced by the DB instruction;

an interprocess communication IPC intercept operable to intercept the identified attempt to access the database resource, the IPC intercept defined by a dynamic linked library (DLL), identifying the attempt including replacing the defined DLL for database access with an interface wrapper, the interface wrapper for identifying the local agent as a responsive entity for database calls such that the interface wrapper spoofs the database access gateway as an entity responsive to database access attempts, the interface wrapper thus defining an IPC intercept for receiving database connection attempts prior to receipt by the database access gateway;

intercepting occurring in a prioritized manner with respect to receipt of the access attempt by the access gateway, the prioritized manner including:

establishing, in response to an identified connection attempt, an event notification list responsive to database access attempts using an identified connection; and storing, in the event notification list, the local agent as the first entity to receive control from a database access attempt via the identified connection, the event notification list operable to initiate handlers responsive to an event;

the local agent further operable to transmit, in a nondestructive manner, the intercepted access attempt to a data security device, the nondestructive manner operable to preserve the intercepted access attempt for successive receipt by the access gateway, the local agent further operable to reroute the intercepted access attempts to the data security device, the data security device operable to offload data security decisions as a consolidated appliance, the offloaded data security decisions relieving a host from processing the data security decisions.

20. The agent of claim 19 wherein the local agent is operable to intercept in a prioritized manner, and further operable to:

receive the access attempt into an interception register prior to receipt by the access gateway;

invoke a prioritized request to activate a reading operation of the interception register, invoking occurring prior to activation of a read operation of the access attempt on behalf of the access gateway; and read the access attempt from the interception register, the interception register subsequently appearing undisturbed to the access gateway.

21. The agent of claim 19 wherein the local agent is operable to, prior to identifying the access attempt, establish the IPC intercept operable to receive an IPC communication directed to the access gateway prior to receipt of the IPC communication by the access gateway.

22. The agent of claim 21 wherein the local agent is further operable to:

identify an event corresponding to the communication via an IPC mechanism;

identify a local event object corresponding to the event, the local event object;

having a notification list adapted to include registrants of an occurrence of the event; and register the local agent in the notification list, the local agent registered before the access gateway to receive notifications prior to receipt of the notification by the registered access gateway.

23. The agent of claim 19 wherein the local agent is further operable to listen, at a common access point, for an incoming connection to the database resource, the common access point adapted to aggregate access attempts to the database resource from a plurality of access mediums.

24. The agent of claim 19 wherein the local agent is operable to reroute local access attempts in a lightweight manner such that the data security device is operable to receive local and remote access attempts, wherein security coverage of the DB server for network and local access attempts occur via a common appliance.

25. The agent of claim 19 wherein the local agent is further operable to:

receive, from a notification object responsive to an event handler, an indication of an IPC communication indicative of a DB access attempt;

identify an instruction register in a shared memory area, the instruction register having a database instruction corresponding to the access attempt;

retrieve the DB instruction from the identified instruction register; and transmit the retrieved DB instruction to the data security device.

26. The agent of claim 19 wherein the local agent is further operable to:

determine an IPC mechanism to be employed by a local client for accessing the DB resource;

establish an IPC intercept from a common access point employed by database clients for accessing the DB resource; and receive the access attempt at the local agent via the IPC intercept prior to receipt of the access attempt by the access gateway.

27. The agent of claim 26 wherein the local agent is further operable to:

identify a plurality of access paths to a protected resource;

identify a common access point for the access paths to the protected resource, access attempts occurring exclusively via the identified access point for the identified access paths.

28. The agent of claim 19 wherein the local agent is further operable to:

establish an interface wrapper between the access gateway and the local client, the interface wrapper operable to identify an IPC mechanism adapted to transport communications between the access gateway and the local client; and modify the identified IPC mechanism to inform the local agent of the communications between the access gateway and the local client prior to informing the access gateway of the communication.

29. The agent of claim 28 wherein the IPC mechanism is a shared memory portion including a plurality of instruction registers, the instruction registers operable to buffer a DB instruction for receipt by the access gateway.

30. The agent of claim 19 wherein the local agent is a lightweight agent operable to intercept the access attempt and transmit the intercepted DB instruction to a data security device, the local agent avoiding analyzing the access attempt on a DB host supporting the DB server.

31. The agent of claim 19 wherein the local agent is further operable to:

block the intercepted access attempt from receipt by the access gateway, and selectively unblock the access attempt depending on a data security decision indicative of the propriety of the access attempt.

32. The agent of claim 31 wherein the local agent is responsive to the data security device for:

computing the data security decision at the data security device; and transmitting the data security decision to the local agent, the local agent operable to permit receipt of the access attempt by the DB server.

33. The agent of claim 32 wherein the data security device is operable to selectively log and block the access attempt, the data security decision including processing selected from the group consisting of firewalls, filters, intrusion detectors, alarms, alerts, tunneling and passwords.

34. A data security device for monitoring access to a protected database resource comprising:

a memory comprising a computer readable storage medium operable to store an encoded set of processor based instructions performable by a local agent;

a processor operable to execute the instructions in the memory;

an interface operable for interconnection with a database host, the data security device in communication with the local agent on the database host, the local agent responsive to the instructions to:

identify an attempt to access the database resource, the access attempt being local and directed to an access gateway of the database resource via an interprocess communication (IPC) mechanism defined by a dynamic linked library (DLL);

intercept the identified attempt to access the database resource, intercepting occurring in a prioritized manner with respect to receipt of the access attempt by the access gateway, intercepting further comprising:

replacing the defined DLL for database access with an interface wrapper, the interface wrapper for identifying the local agent as a responsive entity for database calls such that the interface wrapper spoofs the database access gateway as an entity responsive to database access attempts, the interface wrapper thus defining an IPC intercept for receiving database connection attempts prior to receipt by the database access gateway;

identifying, at least one interprocess communication operation, each of the identified IPC operation corresponding to an event, the event derived from a database instruction;

establishing, in response to an identified connection attempt, an event notification list responsive to database access attempts using an identified connection;

instantiating a local event object corresponding to the event, the local event object having a notification list indicative of notifications of an object to be made upon an occurrence of the event; and storing, in the event notification list, the local agent as an first entity to receive control from a database access attempt via the identified connection, the event notification list operable to initiate handlers responsive to the event; and transmit, in a nondestructive manner, the intercepted access attempt to a local agent, the nondestructive manner operable to preserve the intercepted access attempt for successive receipt by the access gateway.

35. A computer program product having a computer readable storage medium operable to store computer program logic embodied in computer program code encoded as a set or processor based instructions thereon for, when executed by a processor in a computer, perform steps for monitoring access to a protected database resource comprising:

computer program code for identifying an attempt to access the database resource, the access attempt being local and directed to an access gateway of the database resource;

computer program code for intercepting the identified attempt to access the database resource, intercepting occurring in a prioritized manner with respect to receipt of the access attempt by the access gateway, computer program code for intercepting further comprising:

computer program code for determining an interprocess communication (IPC) mechanism to be employed by a local client for accessing the database resource, the IPC mechanism defined by a dynamic linked library (DLL);

computer program code for identifying, via a common access point for the access paths to the protected resource, access attempts occurring via the identified access point for the identified access paths, identifying the access attempts including:

replacing the defined DLL for database access with an interface wrapper, the interface wrapper for identifying the local agent as a responsive entity for database calls such that the interface wrapper spoofs the database access gateway as the entity responsive to database access attempts, the interface wrapper thus defining an IPC intercept for receiving database connection attempts prior to receipt by the database access gateway; and establishing, in response to an identified connection attempt, an event notification list responsive to database access attempts using an identified connection;

computer program code for establishing an IPC intercept from the common access point employed by database clients for accessing the DB resource by storing, in the event notification list, a local agent as the first entity to receive control from a database access attempt via the identified connection, the event notification list operable to initiate handlers responsive to an event; and receiving the access attempt at the local agent via the IPC intercept prior to receipt of the access attempt by the access gateway; and computer program code for transmitting, in a nondestructive manner, the intercepted access attempt to the local agent, the nondestructive manner operable to preserve the intercepted access attempt for successive receipt by the access gateway.

36. An encoded set of processor based instructions on a computer readable storage medium that, when executed by a processor responsive to the instructions, perform a method of monitoring access to a protected database resource comprising:

identifying an attempt to access the database resource, the access attempt being local and directed to an access gateway of the database resource, identifying the access attempt further comprising listening, at a common access point, for an incoming connection to the database resource, the common access point adapted to aggregate access attempts to the database resource from aplurality of access mediums;

intercepting the identified attempt to access the database resource, intercepting occurring in a prioritized manner with respect to receipt of the access attempt by the access gateway, intercepting further comprising:

determining an interprocess communication (IPC) mechanism to be employed by a local client for accessing the database resource, the IPC mechanism defined by a dynamic linked library (DLL);

identifying, via a common access point for the access paths to the protected database resource, access attempts occurring via an identified access point for an identified access paths, identifying the access attempts including:

replacing the defined DLL for database access with an interface wrapper, the interface wrapper for identifying a local agent as a responsive entity for database calls such that the interface wrapper spoofs the database access gateway as an entity responsive to database access attempts, the interface wrapper thus defining an IPC intercept for receiving database connection attempts prior to receipt by the database access gateway; and establishing, in response to an identified connection attempt, an event notification list responsive to database access attempts using an identified connection, the access attempt being deterministic of a database instruction, such that the local agent is in communication with a data security device operable to analyze a propriety of the access attempt from objects and data values referenced by the database instruction;

establishing an IPC intercept from the common access point employed by database clients for accessing the database resource by storing, in the event notification list, a local agent as a first entity to receive control from a database access attempt via an identified connection, the event notification list operable to initiate handlers responsive to an event; and intercepting the access attempt at the local agent via the IPC intercept prior to receipt of the access attempt by the access gateway; and receiving, in a nondestructive manner, the intercepted access attempt by a local agent, the nondestructive manner operable to preserve the intercepted access attempt for successive receipt by the access gateway, transmitting further comprising rerouting the intercepted access attempts to the data security device, the data security device operable to offload data security decisions as a consolidated appliance, the offloaded data security decisions relieving the host from processing the data security decisions.

37. The method of claim 36 wherein intercepting the access attempt further comprises:

identifying, at least one interprocess communication operation, each of the identified IPC operation corresponding to an event, the event derived from a database (DB) instruction;

instantiating a local event object corresponding to the event, the local event object having a notification list indicative of notifications of an object to be made upon an occurrence of the event; and storing, in a first position in the notification list, an indication of the local agent, the first position operable to provide the first notification upon an occurrence of the event, prior to other notifications in the notification list; and storing, in a successive position in the notification list, an indication of the access gateway, the access gateway operable to employ the IPC event for database instructions.

38. In a network security environment, a method of redirecting message traffic under scrutiny to a data security device via an interprocess communication (IPC) intercept, comprising:

determining a dynamic linked library (DLL) responsive to database access requests for transferring control to a database access gateway;

replacing the determined DLL for database access with an interface wrapper, the interface wrapper for identifying the local agent as a responsive entity for database calls such that the interface wrapper spoofs the database access gateway as the entity responsive to database access attempts, the interface wrapper thus defining an IPC intercept for receiving database connection attempts prior to receipt by the database access gateway;

identifying an attempt to connect to the database;

establishing, in response to the identified connection attempt, an event notification list responsive to database access attempts using the identified connection;

storing, in the event notification list, the local agent as the first entity to receive control from a database access attempt via the identified connection, the event notification list operable to initiate handlers responsive to the event;

identifying an event corresponding to a database access attempt via the identified connection;

storing the database access attempt in an instruction register in shared memory operable to receive pending database requests;

publishing the event corresponding to the database access attempt, publishing causing invocation according to the event notification list; and invoking the local agent responsive to the event notification list, the invoking causing the local agent to copy the database access attempt from the shared memory and forward the database access attempt to the data security device for processing and logging as a database access.

39. The method of claim 38 further comprising establishing the database access gateway as a successive entry in the notification list;

generating a second notification responsive to the database access attempt invoking, as a successive entry in the event notification list, the database access gateway, thus permitting the database access attempt to continue unmodified.

\* \* \* \* \*